United States Patent
Klingler et al.

(10) Patent No.: US 8,038,516 B2
(45) Date of Patent: Oct. 18, 2011

(54) AIR VENT, ESPECIALLY FOR A MOTOR VEHICLE

(75) Inventors: Dietrich Klingler, Heubach (DE); Klaus Voigt, Bietigheim-Bissigen (DE); Reinhold Burr, Heidenheim (DE)

(73) Assignee: Behr GmbH & Co. KG, Stuttgart (DE)

( * ) Notice: Subject to any disclaimer, the term of this patent is extended or adjusted under 35 U.S.C. 154(b) by 861 days.

(21) Appl. No.: 10/567,148

(22) PCT Filed: Aug. 4, 2004

(86) PCT No.: PCT/EP2004/008732
§ 371 (c)(1),
(2), (4) Date: Jan. 3, 2007

(87) PCT Pub. No.: WO2005/016673
PCT Pub. Date: Feb. 24, 2005

(65) Prior Publication Data
US 2007/0111652 A1    May 17, 2007

(30) Foreign Application Priority Data

Aug. 11, 2003  (DE) .................. 103 37 135
May 13, 2004  (DE) .......... 10 2004 024 064

(51) Int. Cl.
*B60H 1/34* (2006.01)
(52) U.S. Cl. ...................... 454/155; 454/145
(58) Field of Classification Search ........... 454/155
See application file for complete search history.

(56) References Cited

U.S. PATENT DOCUMENTS

| | | | |
|---|---|---|---|
| 3,832,939 A | 9/1974 | Kakei et al. | |
| 4,938,033 A | 7/1990 | Ogihara et al. | |
| 5,003,867 A * | 4/1991 | Sodec et al. | 454/236 |
| 2006/0135054 A1* | 6/2006 | Burr et al. | 454/155 |

FOREIGN PATENT DOCUMENTS

| | | |
|---|---|---|
| DE | 27 02 334 A1 | 12/1977 |
| DE | 32 23 812 A1 | 12/1983 |
| DE | 34 36 539 C1 | 4/1986 |
| DE | 92 14 638.4 U1 | 2/1993 |
| DE | 44 10 120 C2 | 6/1995 |
| DE | 198 51 490 A1 | 5/2000 |
| DE | 100 14 971 A1 | 10/2001 |
| DE | 699 01 356 T2 | 1/2003 |
| DE | 699 02 356 T2 | 1/2003 |
| DE | 102 43 974 A1 | 4/2004 |
| EP | 0 713 792 A1 | 5/1996 |
| EP | 0 936 091 A1 | 8/1999 |
| EP | 1 332 899 A2 | 8/2003 |
| FR | 2 799 695 A1 | 4/2001 |
| JP | 61-500565 | 3/1986 |
| JP | 63043927 A * | 2/1988 |
| JP | 10-246500 | 9/1998 |
| WO | WO 02/072371 A1 | 9/2002 |

* cited by examiner

*Primary Examiner* — Steven B McAllister
*Assistant Examiner* — Helena Kosanovic
(74) *Attorney, Agent, or Firm* — Muncy, Geissler, Olds & Lowe, PLLC

(57) ABSTRACT

The invention relates to an air vent (1), especially for a motor vehicle, comprising an air channel for supplying air, and an air guiding device (4). The air channel is divided into at least two essentially cylindrical partial channels (11*a*, 11*b*) in the air guiding device (4), said cylindrical partial channels (11*a*, 11*b*) being parallel to each other. Especially other partial channels (12*a*, 12*b*) provided in the inventive air vent generate a swirling flow.

19 Claims, 8 Drawing Sheets

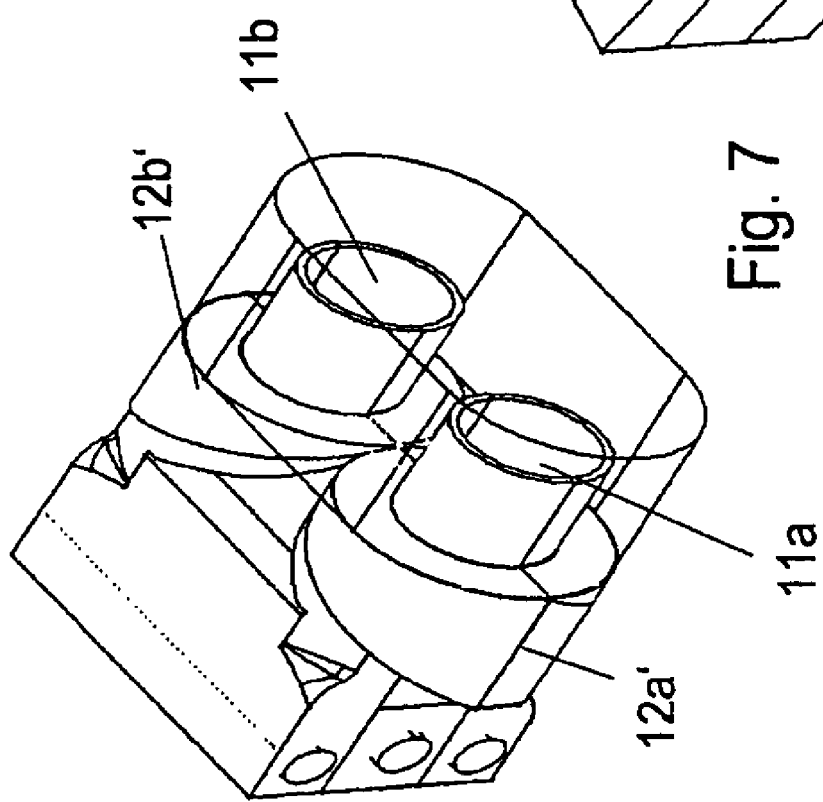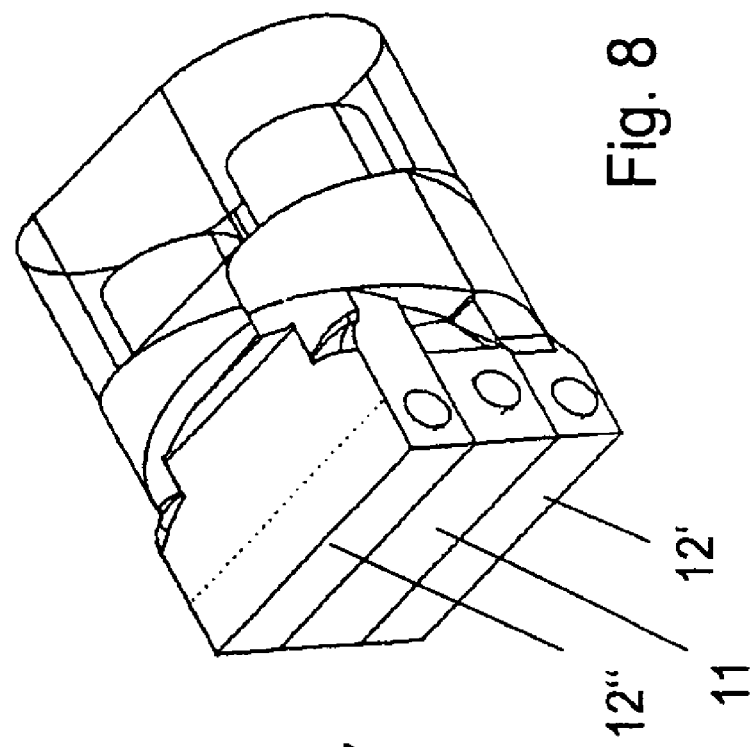

Lower swirl guide

AIR VENT, ESPECIALLY FOR A MOTOR VEHICLE

Figure 1:
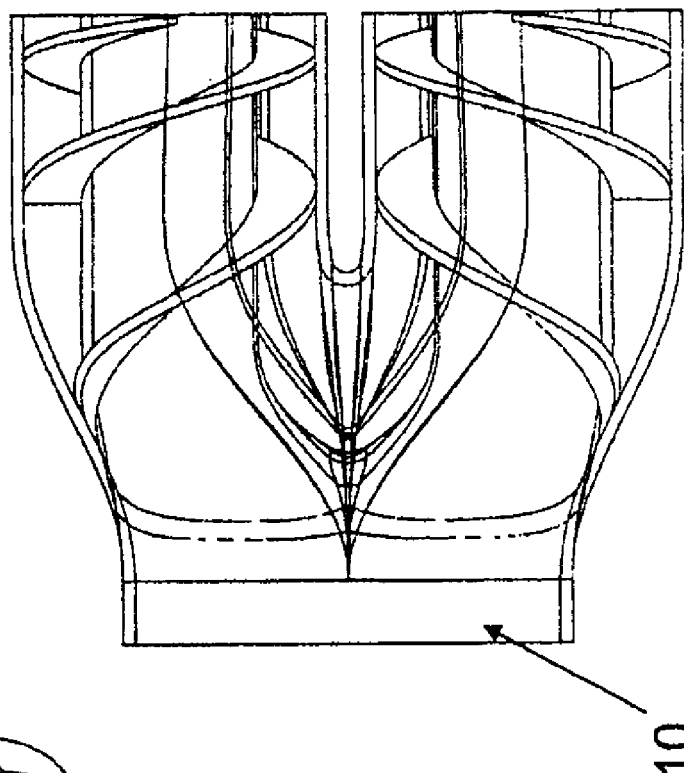

The invention relates to an air vent, especially for a motor vehicle, according to the preamble of claim 1. The invention relates, furthermore, to a method for controlling the air outflow of an air vent.

DE 699 01 356 T2 discloses an air vent for the forced ventilation of spaces, such as passenger spaces in road or rail vehicles, which comprises one or more blowing units which can be distributed in the space to be ventilated according to the size of the latter. A blowing unit in this context consists of a fan set and of blowing devices, such as, for example, nozzles, the installation being characterized in that each of the fan sets has connected to it a blower set which has a central blowing device and at least two peripheral blowing devices which are distributed around the central blowing, the blowing devices having a tubular housing and a blowing guide, which is accommodated in the housing, and comprising at least three air jet conduction ramps which extend in each case upstream and downstream of the blowing devices first in a radial plane and then spirally along a rectilinear part of an approximately central axis of the blowing device. The spiral form in this case yields a border jet and ensures a greater distribution of the stream. An air vent of this type, however, is unsuitable for directional ventilation, for example in conjunction with a multizone air conditioning system of a motor vehicle.

The object of the invention is to make an improved air vent available.

This object is achieved by means of an air vent having the features of claim 1. Advantageous refinements are the subject matter of the subclaims.

According to the invention, an air vent with an air-supplying air duct and with an air conduction device is provided, in which the air duct in the air conduction device is divided into at least two essentially cylindrical subducts, and the cylindrical subducts run parallel with respect to one another, a device for setting the air stream being arranged thereafter.

Preferably, a division into four air streams takes place, at least two subducts running parallel with respect to one another. Preferably, at least one of the air ducts is arranged around another subduct, in particular concentrically thereto. In this case, preferably in the outer subduct, a helical guide is provided, which may be formed by a correspondingly arranged wall, so that the outer air stream acquires a swirl. Preferably, the pitch of the helix decreases toward the outlet port, so that the flow velocity of the air is increased. Preferably, in this case, two guides are provided in a subduct.

Preferably, the metering device is designed in such a way that the air streams of the individual subducts are controllable, in particular independently of one another. Preferably, the metering device controls both the distribution of the in flowing air to the individual subducts and its respective metering. This allows fine metering. Preferably, in this case, the metering device provided is an actuating device which has a double flap controlled by means of one or more cam disks. This allows direct manual adjustment by the occupant by means of a rotary knob, so there is no need for any servomotor, any step-up or the like.

Preferably, each cylindrical subduct has arranged around it at least and preferably exactly two helical subducts which can be regulated independently of one another via separate control devices. This allows a considerable shortening of the construction length, with essentially the same result being obtained.

Preferably, in the inflow region, the air duct assigned to the cylindrical subducts is arranged between the two air ducts assigned to the helical subducts. This makes it possible to shorten the construction length further by optimizing the inflow to the subducts.

The cylindrical subducts may project beyond the helical subducts, as seen in the air flow direction, with the result that construction is simplified considerably, while the deterioration in the formation of a swirl is insignificant. As a result of the simplified construction, the production costs can be lowered.

The air vent preferably has a lamellar air conduction device which is arranged downstream of the subducts, as seen in the air flow direction, and which serves for setting the direction, in particular the spot jet.

In this case, for independent setting, the lamellar air conduction device may be designed to be divided centrally, so that the two parts can be regulated independently of one another, if appropriate even in terms of their air quantity, with the result that adjustability can be improved and, because of separate adjustability for the driver and front seat passenger, comfort can be increased considerably.

In the method for controlling the air outflow of an air vent according to the invention, a first metering device or flap of at least one first air duct and a second metering device or flap of at least one second air duct are alternately opened and closed by means of a control device. Preferably, by means of the method according to the invention, at least one first air duct assigned to a helical subduct and at least one second air duct assigned to a cylindrical subduct are alternately closed and opened. This results in a reciprocal outflow of diffuse air and of air flowing out in spot form. This is detected by a vehicle occupant as air fanning and can contribute to an increase in comfort, especially at high vehicle interior temperatures.

In an advantageous refinement of the method, the alternate opening and closing proceed in an oscillating manner. Preferably, the oscillation frequency can be set within a setting range, especially between 0.5 Hz and 10 Hz.

In a further advantageous variant of the method according to the invention, the setting of the oscillation frequency takes place via regulation by means of one or more regulating parameters. The regulating parameters used in this case are, in particular, the vehicle interior temperature and/or the difference between a desired interior temperature and an actual interior temperature and/or a blower setting. For example, in the case of a very high interior temperature, for example when the vehicle is started up after a lengthy standstill in the sun, the oscillation frequency may be higher and, along with the cooling operation, may decrease until a limit value is reached at which there is a changeover to continuous operation without oscillation. Regulation via a blower setting makes it possible, for example, to adapt the oscillation frequency to different outflow velocities of the air as a result of a differently set blower intensity.

Figure 2:
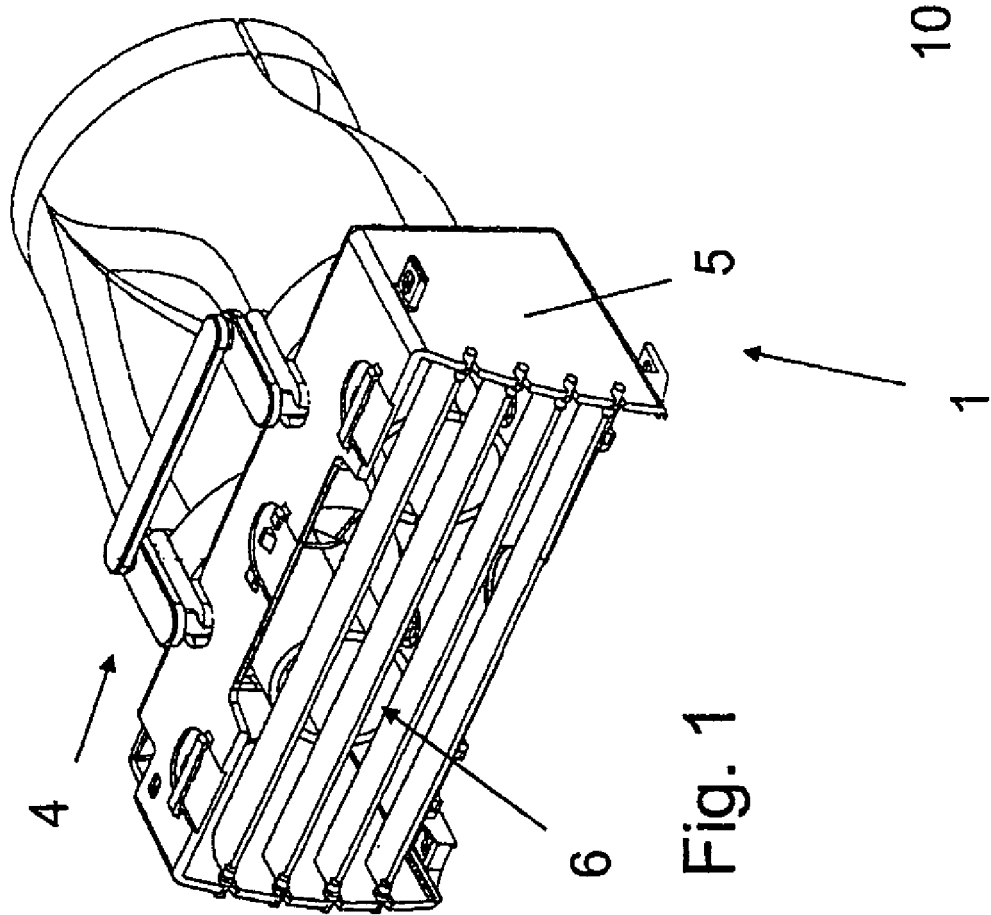
Figure 4:
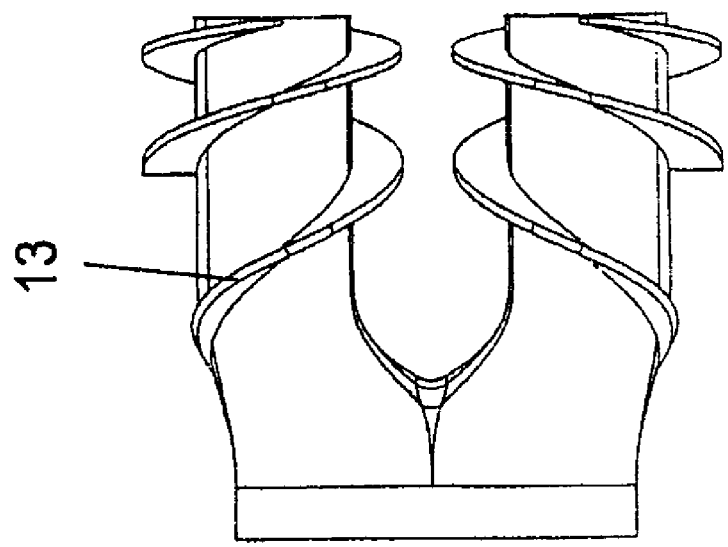
Figure 3:
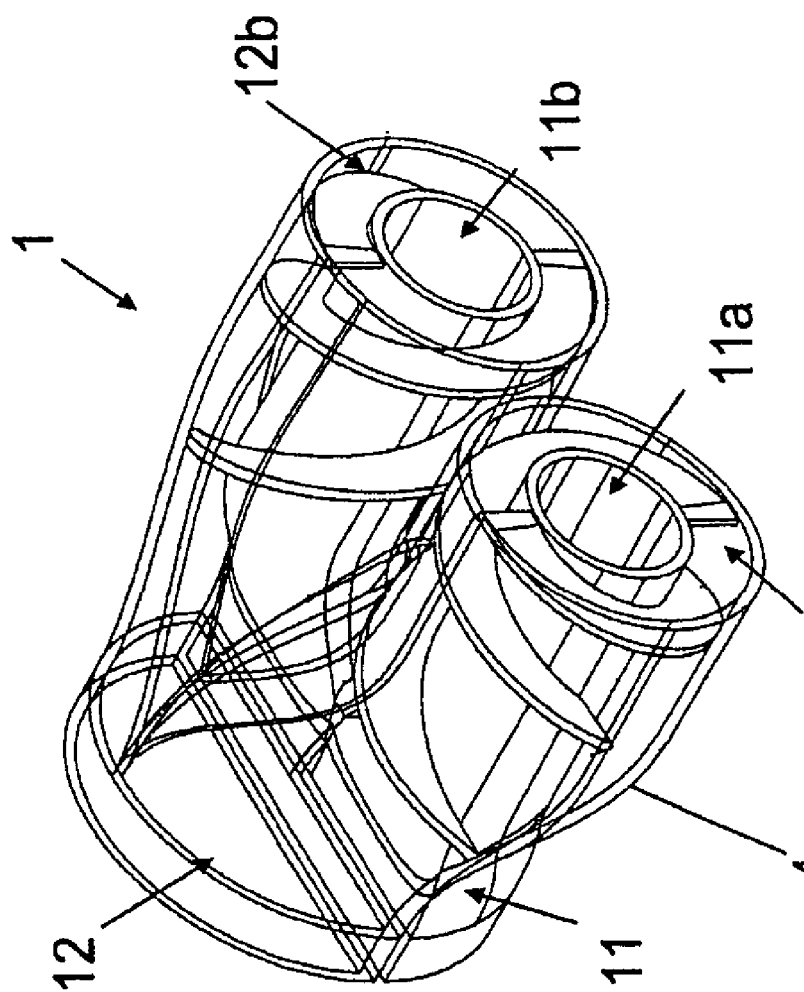
Figure 5:
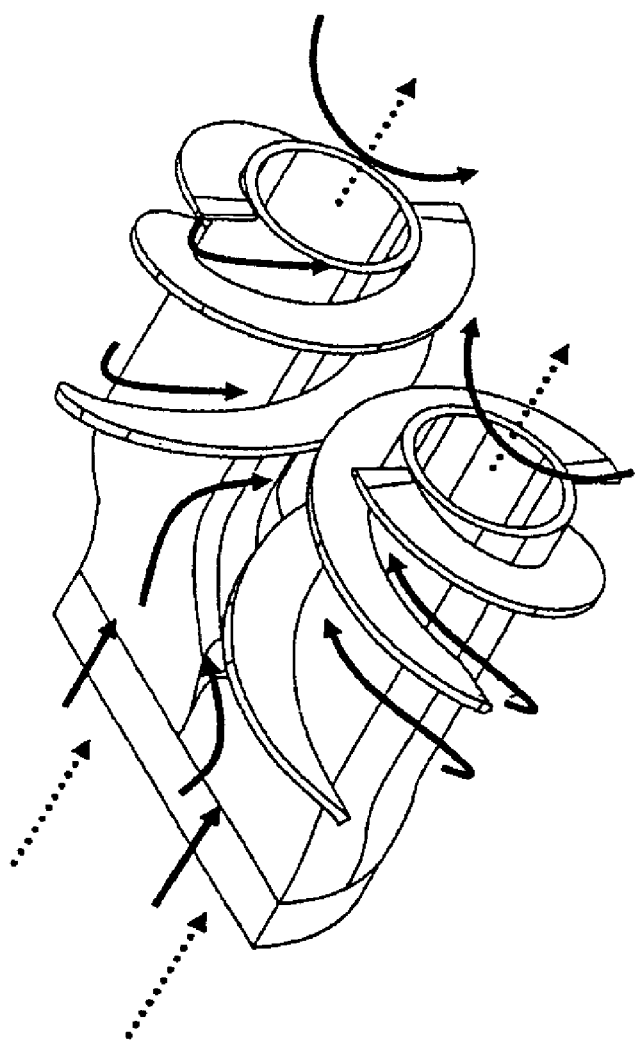
Figure 6:
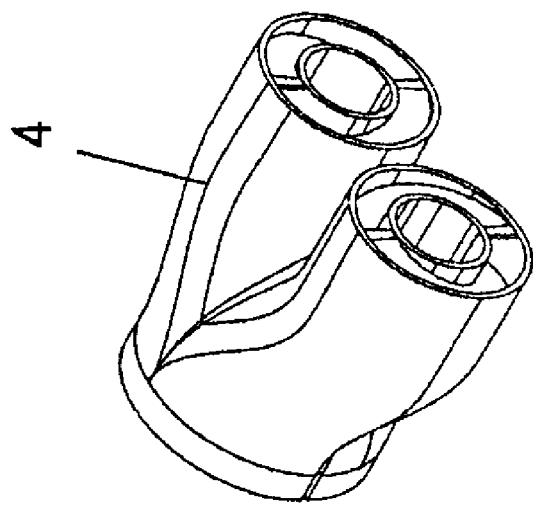
Figure 10:
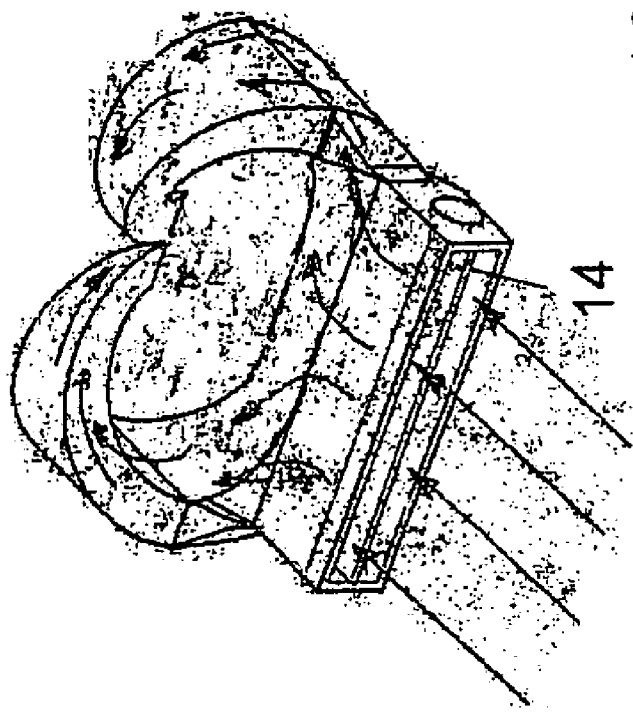
Figure 9:
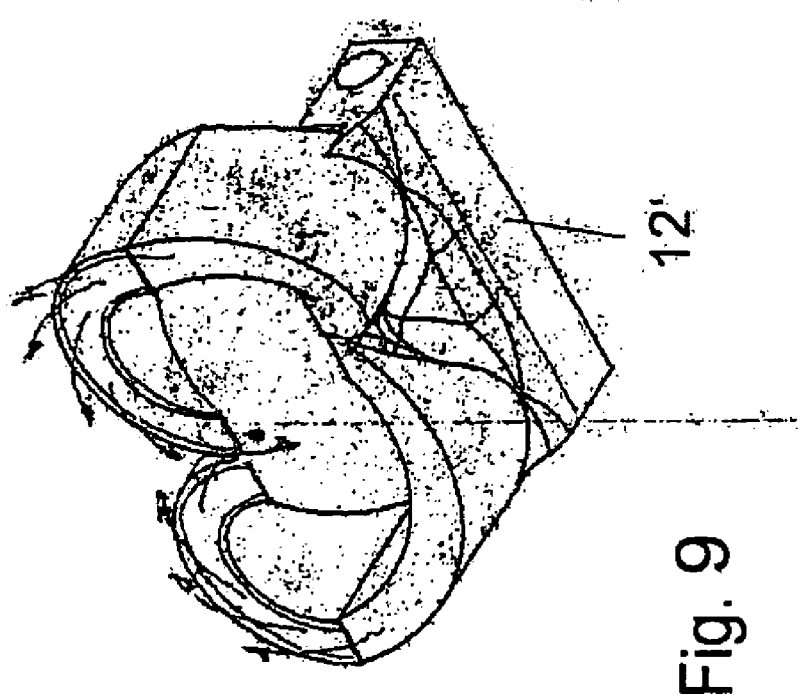
Figure 12:
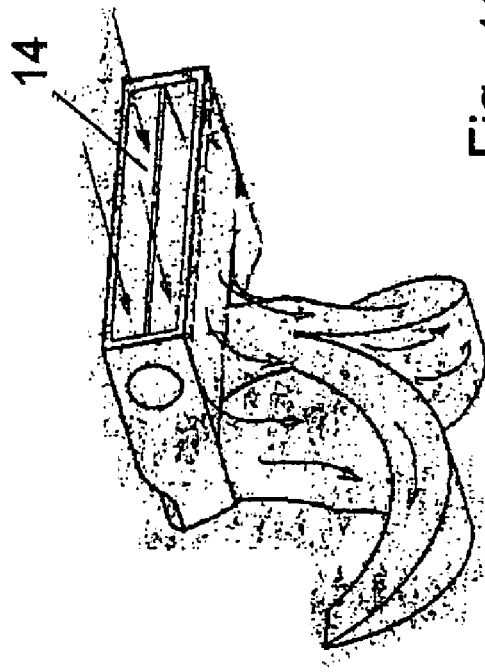
Figure 11:
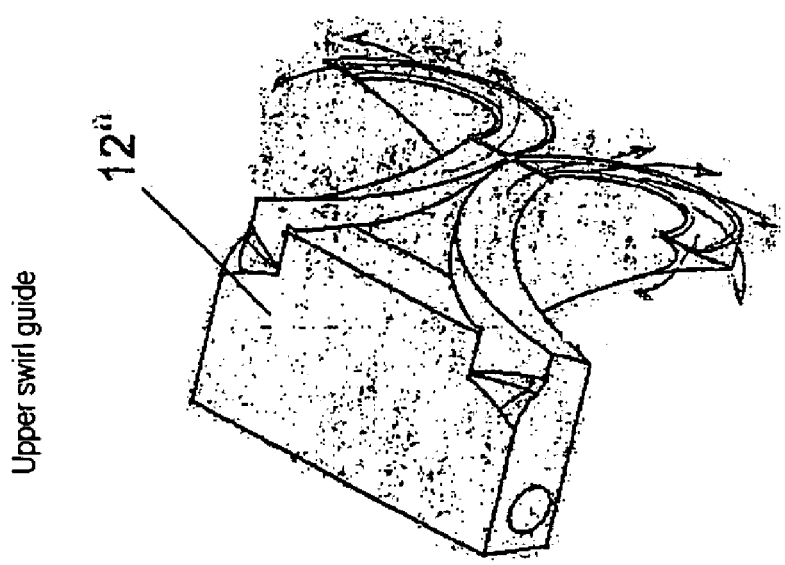
Figure 13:
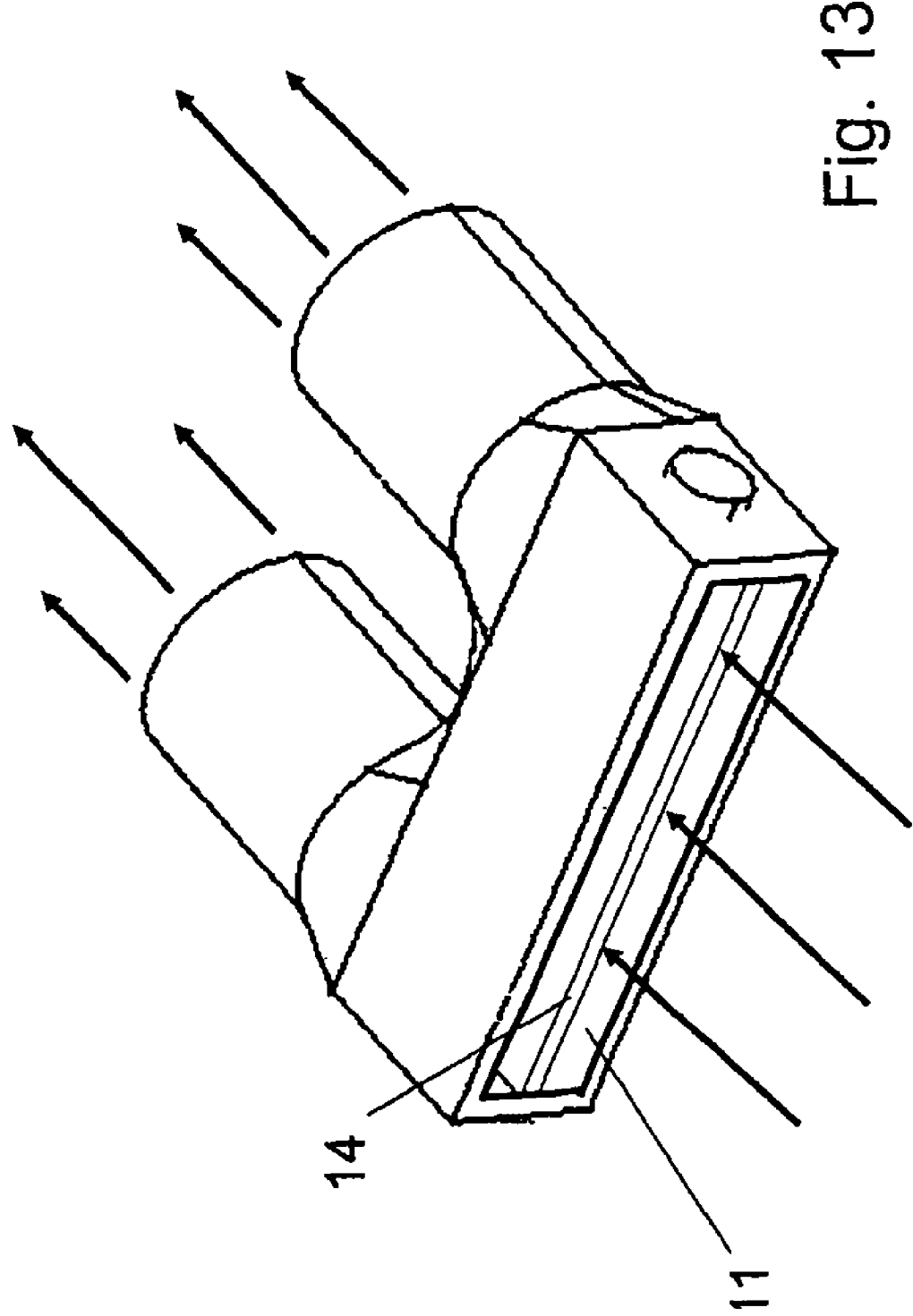
Figure 14:
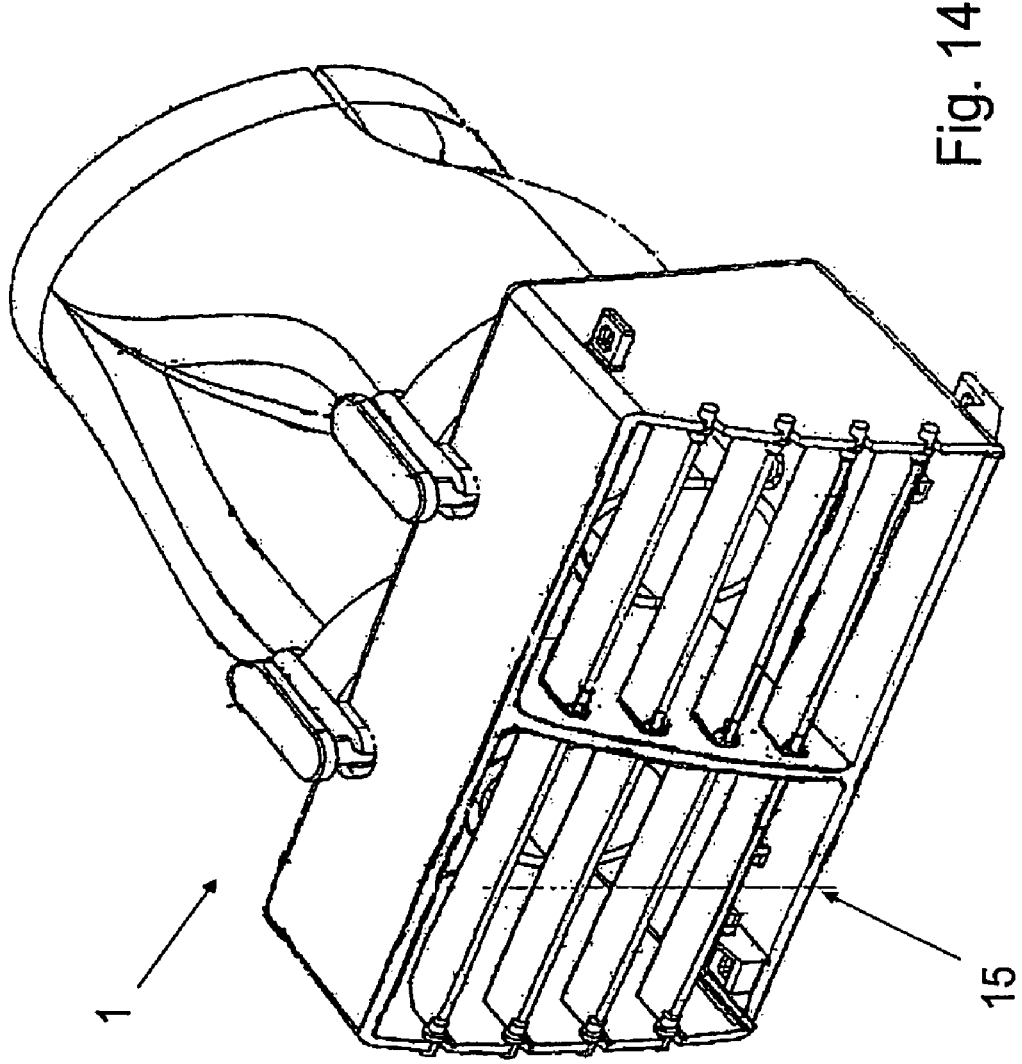

The invention is explained in detail below by means of four exemplary embodiments, partially with reference to the drawing in which:

FIG. 1 shows a view of an air vent according to the first exemplary embodiment,

FIG. 2 shows a top view of the central region of the air vent of FIG. 1, with inner contours illustrated, FIG. 3 shows a view of the central region of the air vent of FIG. 1 from another perspective, FIG. 4 shows a top view of the inner region of the air vent of FIG. 1, FIG. 5 shows a view of the inner region of the air vent of FIG. 1 from another perspective, with the flow run illustrated, FIG. 6 shows an illustration corresponding to FIG. 2, FIG. 7 shows a perspective illustration of the central region of an air vent according to the second exemplary embodiment, FIG. 8 shows another perspective illustration of the air vent of FIG. 7, FIG. 9 shows a perspective illustration of the lower swirl guide, FIG. 10 shows another perspective illustration of the lower swirl guide, FIG. 11 shows a perspective illustration of the upper swirl guide, FIG. 12 shows another perspective illustration of the upper swirl guide, FIG. 13 shows a perspective illustration of the spot part, FIG. 14 shows a perspective view of an air vent according to the third exemplary embodiment.

An air vent 1 according to the invention, as illustrated in the figures, follows an air duct (not illustrated) and comprises a metering device (not illustrated). Express reference is made, in this context, to DE 102 43 974 A1, the relevant disclosure of which is expressly incorporated herein. The metering device is also arranged in the region of the air duct. The air vent 1 comprises, furthermore, an air conduction device 4, which follows the metering device, and a device 5 for setting the direction of the air stream, said device being arranged in the region of the outlet port 6. This device 5 is formed, in the present instance, by a conventional lamellar grid with adjustable lamellae. The outlet port 6 and therefore also the device 5 for setting the direction of the air stream are installed in the instrument panel (not illustrated) of a motor vehicle. The occupant can thus set the desired direction of the air stream directly.

The air conduction device 4 is designed in such a way that a division of the air duct into two subducts 11 and 12 of essentially equal size takes place at its inlet region 10. The division takes place in the radial direction transversely with respect to the essentially circular cross section of the air duct. In this case, no change in direction with regard to the direction of the air duct is provided in the initial region, also designated as the inlet region of the air conduction device 4.

After the inlet region of the air conduction device 4, a second division of the two subducts 11 and 12 is provided, this time the division taking place perpendicularly to the previous division. The cross section, circular in the inlet region 10, in this case forks into two circular cross sections running parallel next to one another, so that overall four subducts 11a, 11b, 12a and 12b are provided. The subduct 11a coming from the subduct 11 is in this case of tubular design. By contrast, the subduct 12a coming from the subduct 12 is of hollow-cylindrical design and runs outside the subduct 11a. The areas of the subducts 11a, 11b, 12a and 12b correspond approximately to one another. The subducts 11a and 11b are also designated below as inner subducts and the subducts 12a and 12b as outer subducts. In the subduct 12a, two helically designed guides 13 are provided, which further subdivide the subduct 12a. In this case, the pitch of the helix decreases toward the outlet port 6. The subducts 11b and 12b correspond to the subducts 11a and 12a, but they are designed axially symmetrically with respect to the plane of the second division (see FIG. 4).

By virtue of the helical guides 13, the air coming through the outer subducts 12a, 12b is provided with a swirl, whereas the air coming through the inner subducts 11a and 11b runs through these in a straight line and flows out in a straight line.

According to the present exemplary embodiment, the metering device provided is an actuating device with an double flap which is arranged parallel to the division of the duct and which is controllable via two cam disks connected to one another by means of a shaft, in such a way that each subduct 11, 12 can be opened and closed individually. Control takes place by means of the occupant via an actuating member arranged on the instrument panel (not illustrated), in the present instance via a rotary knob which is connected directly to the shaft.

The air vent 1 functions as follows: when the double flap is in a position which releases both subducts 11 and 12, in each case an approximately equal air stream passes into the two subducts 11 and 12 and further on into the subducts 11a, 11b, 12a and 12b. The air (indicated in FIG. 5 by dotted arrows) flowing through the inner subducts 11a, 11b passes directly through the air vent 1 and, in the case of a straight setting of the lamellar grid, is discharged into the vehicle interior in an essentially straight direction and with a sufficiently uniform flow profile. The air (indicated in FIG. 5 by unbroken arrows) flowing through the outer subducts 12a and 12b is deflected by the helical guides 13 and thereby acquires a swirl which is still present also at the outlet port 6 and ensures some swirling of the air and fans out the respective air streams coming through the inner subducts 11a and 11b.

When one part of the double flap closes the subduct 12 and therefore the outer subducts 12a and 12b and the subduct 11 is released, the air passes solely through the inner subducts 11a and 11b to the outlet port 6, so that an essentially swirl-free air jet is discharged into the vehicle interior (spot effect).

By contrast, when the other part of the double flap closes the subduct 11 and the subduct 12 is released, the air passes solely through the outer subducts 12a and 12b of the air conduction device 4 and thereby acquires the abovementioned swirl which is also still present at the outlet port 6 and ensures a strong swirling of the air (diffuse setting).

Intermediate ranges may be activated, as desired, so that a fine metering of the air stream is possible with the aid of the air vent 1.

The second exemplary embodiment, which shows an air vent 1 with a shortened construction length, corresponds essentially to the first exemplary embodiment, but each of the inner subducts 11a and 11b has provided around it in each case two outer subducts 12a', 12a" and 12b', 12b" formed separately from one another. In this case, the subducts 12a' and 12b' and the subducts 12a" and 12b" each have a common subduct 12' and 12", and the subduct 11, which branches into the two inner subducts 11a and 11b (spot ducts), is arranged between the subducts 12' and 12", as is evident especially from FIG. 8. In light of the arrangement, the subduct 12' is also referred to below as the lower subduct 12' and the subduct 12" also as the upper subduct 12".

The three subducts 11, 12' and 12" in each case have an approximately rectangular cross section in their inlet region, the middle subduct 11 being of somewhat larger design. In this case, control devices for controlling the air distribution to the individual subducts 11, 12' and 12" are provided in the form of three flaps 14 in this region.

As is evident especially from FIGS. 9 to 12 in which the flow run is illustrated by arrows, by the subducts 12' and 12" being designed separately and being arranged laterally with respect to the middle subduct 11, a deflection of the air flow into the desired helical flow direction can take place very quickly, so that the construction length can be virtually halved.

Furthermore, as is evident from FIGS. 7 and 8, the middle subducts 11a and 11b project markedly beyond the helical subducts 12a', 12a", 12b', 12b", so that, on account of simplified geometries, the production costs can be lowered, without the flow run being appreciably influenced adversely. In this case, however, the middle subducts 11a and 11b also end within the housing of the air vent 1.

FIG. 13 shows the spot part belonging to the helical subducts 12' and 12" illustrated in FIGS. 9 to 12, together with the subduct 11 which is likewise designed with a flap 14.

According to the third exemplary embodiment illustrated in FIG. 14, an air vent 1 is illustrated, the construction of which corresponds essentially to that of the second exemplary embodiment, although this design may also be applied to the first exemplary embodiment. In this case, a centrally divided lamellar air conduction device 15 is provided on the air vent 1, so that the air flowing out from the subducts 11a, 12a', 12b' can be deflected into the vertical and/or horizontal direction independently of that flowing out from the subducts 11b, 12b', 12b", and/or the part of the air vent can be closed completely.

According to a fourth exemplary embodiment, not illustrated in the drawing, an air vent is provided, in which the subducts 11a, 12a', 12a" can be regulated independently of the subducts 11b, 12b', 12b" by means of a correspondingly designed control device and, correspondingly to the third exemplary embodiment, by means of lamellae of centrally divided design, upstream of the air vent 1.

LIST OF REFERENCE SYMBOLS

1 Air vent
4 Air conduction device
5 Device
6 Outlet port
10 Inlet region
11 Subduct
11a, 11b Inner subduct
12 Subduct
12' Lower subduct
12" Upper subduct
12a, 12b, 12a', 12b', Outer subduct
12a", 12b"
13 Guide
14 Flap
15 Lamellar air conduction device

The invention claimed is:

1. An air vent, especially for a motor vehicle, with an air-supplying air duct and with an air conduction device, the air duct in the air conduction device being divided into at least two essentially cylindrical subducts, wherein the cylindrical subducts are arranged parallel with respect to one another, wherein at least one further subduct is provided, arranged around at least one of the cylindrical subducts, and wherein, upstream of the air conduction device, a metering device is arranged, which is designed in such a way that the air capable of being supplied to the individual subducts is controllable.

2. The air vent as claimed in claim 1, wherein the air conduction device provides a division of the air supplied through the air duct into at least four air streams.

3. The air vent as claimed in claim 1, wherein the air conduction device has subducts arranged concentrically one in the other.

4. The air vent as claimed in claim 1, wherein the air conduction device has at least one helical or longitudinally indrawn spiral subduct.

5. The air vent as claimed in claim 3, wherein the helical subduct has at least one guide which is arranged helically.

6. The air vent as claimed in claim 4, wherein the pitch of the helix decreases toward the outlet port.

7. The air vent as claimed in claim 1, wherein a device for setting the direction of the air stream is arranged after the air conduction device.

8. An air vent, especially for a motor vehicle, with an air-supplying air duct and with an air conduction device, the air duct in the air conduction device being divided into at least two essentially cylindrical subducts, wherein the cylindrical subducts are arranged parallel with respect to one another, wherein at least one further subduct is provided, arranged around at least one of the cylindrical subducts, and wherein the ratio of a narrowest cross section of one of the cylindrical subducts to the narrowest cross section of the at least one further subduct is variable from 1:1.5 to 1:0.3.

9. An air vent, especially for a motor vehicle, with an air-supplying air duct and with an air conduction device, the air duct in the air conduction device being divided into at least two essentially cylindrical subducts, wherein the cylindrical subducts are arranged parallel with respect to one another, wherein at least one further subduct is provided, arranged around at least one of the cylindrical subducts, and wherein each cylindrical subduct has arranged around it at least two helical subducts which can be regulated independently of one another via separate control devices.

10. The air vent as claimed in claim 9, in each case two helical subducts are arranged around each cylindrical subduct, in the inflow region the air duct assigned to the cylindrical subducts being arranged between the two air ducts assigned to the helical subducts.

11. The air vent as claimed in claim 9, wherein the cylindrical subducts project beyond the helical subducts, as seen in the air flow direction.

12. An air vent, especially for a motor vehicle, with an air-supplying air duct and with an air conduction device, the air duct in the air conduction device being divided into at least two essentially cylindrical subducts, wherein the cylindrical subducts are arranged parallel with respect to one another, wherein at least one further subduct is provided, arranged around at least one of the cylindrical subducts, wherein the air vent has a lamellar air conduction device, and wherein the lamellar air conduction device is of centrally divided design, and the two parts can be regulated independently of one another.

13. A method for controlling the air outflow of an air vent especially for a motor vehicle, with an air-supplying air duct and with an air conduction device, the air duct in the air conduction device being divided into at least two essentially cylindrical subducts, wherein the cylindrical subducts are arranged parallel with respect to one another, wherein at least one further subduct is provided, arranged around at least one of the cylindrical subducts, and wherein a first metering device or flap of at least one first air duct and a second metering device or flap of at least one second air duct are alternately opened and closed.

14. The method as claimed in claim 13, the alternate opening and closing take place in an oscillating manner.

15. The method as claimed in claim 14, wherein the oscillation frequency is selectable within a setting range, especially between 0.5 Hz and 10 Hz.

16. The method as claimed in claim 14, wherein the oscillation frequency is regulated as a function of one or more regulating parameters.

17. The method as claimed in claim 16, the regulating parameters used are the interior temperature and/or the difference between a desired interior temperature and an actual interior temperature and/or a blower setting.

18. A ventilation system for a motor vehicle, characterized by an air vent as claimed in claim 1.

19. The air vent as claimed in claim 18, wherein the air duct includes a centerline and wherein a portion of the air duct centerline near the at least two essentially cylindrical subducts is parallel to centerlines of the at least two essentially cylindrical subducts.

* * * * *